United States Patent Office 2,894,278
Patented July 14, 1959

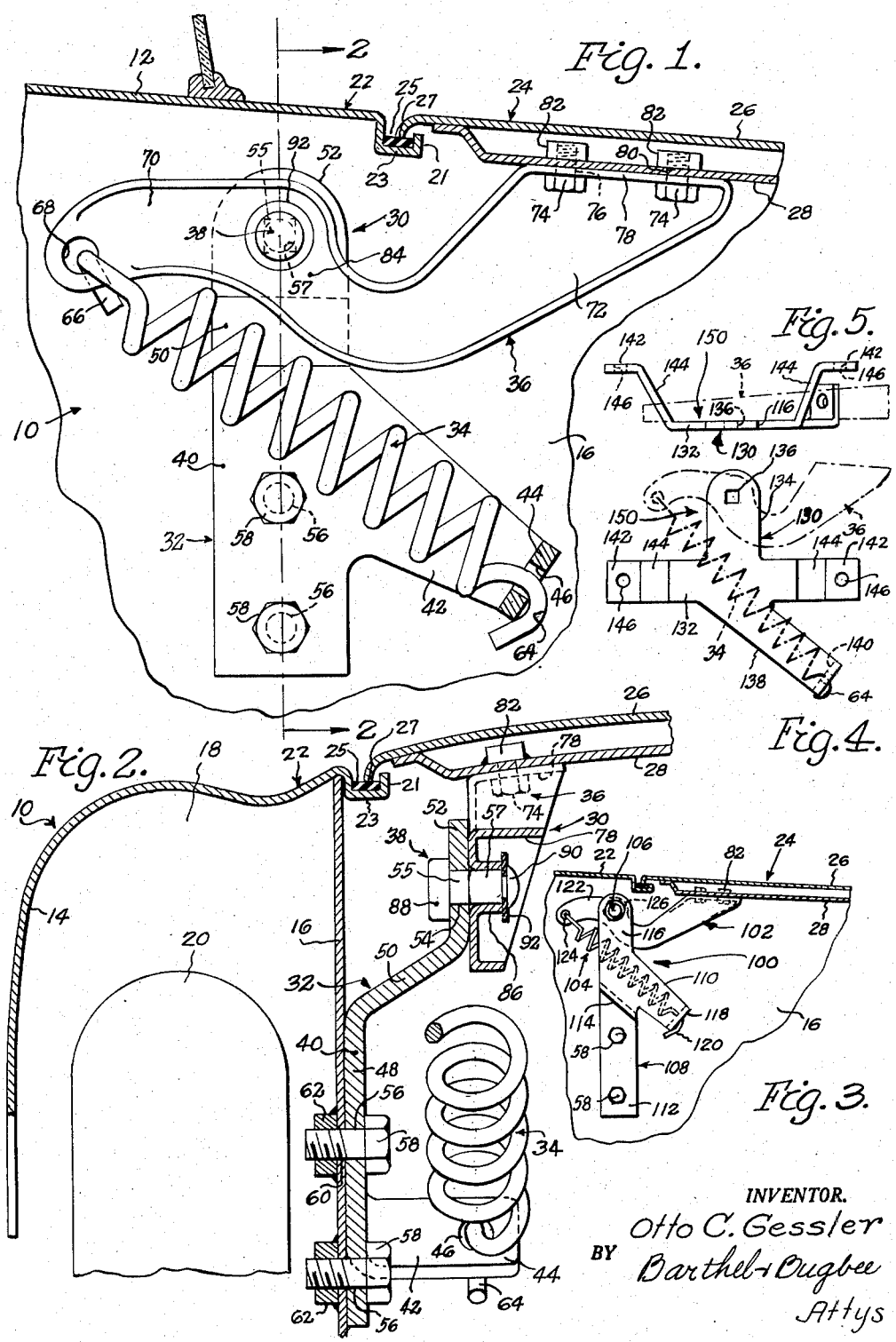

2,894,278
AUTOMOBILE BODY COMPARTMENT HINGE

Otto C. Gessler, Detroit, Mich.

Application November 14, 1956, Serial No. 622,071

6 Claims. (Cl. 16—190)

This invention relates to automobile body hardware and, in particular, to rear deck hinges.

One object of this invention is to provide an automobile body rear deck hinge which will effectively counterbalance the weight of the rear deck lid which closes the trunk compartment and which at the same time is of simpler, less expensive construction.

Another object is to provide an automobile body rear deck hinge which is especially adapted to be supported from the opposite side walls of the trunk compartment, where the hinge bracket and weight counterbalancing spring are out of the way of baggage or other articles carried in the compartment, so that interference or collision between them could not occur.

Another object is to provide a modified automobile body rear deck hinge wherein the supporting bracket is so constructed that it will not only support the hinge lever but will also protect and shield both the counterbalancing spring and the hinge arm from the articles carried in the compartment, and vice versa.

Other objects and advantages of the invention will become apparent during the course of the following description of the accompanying drawing, wherein:

Figure 1 is a fragmentary vertical section through the portion of an autombile rear deck and lid adjacent the junction thereof, interconnected by a hinge, according to one form of the invention;

Figure 2 is a vertical section taken along the line 2—2 in Figure 1;

Figure 3 is a side elevation, similar to Figure 1, of a modified hinge, with the rear deck and lid also in longitudinal section;

Figure 4 is a side elevation of a further modified bracket adapted to employ the counterbalancing spring and hinge lever of Figure 1; and Figure 5 is a top plan view of the further modified hinge bracket shown in Figure 4.

Referring to the drawings in detail, Figures 1 and 2 show an automobile body, generally designated 10, having a rear deck upper wall 12 and side wall or fender portion 14 with a partition of bulkhead 16 extending vertically therebetween to define the wheel compartment 18 for the rear wheel 20 of the vehicle. The rear deck or trunk compartment, generally designated 22, is provided with a lid or swinging cover, generally designated 24, composed of an upper wall 26 and a lower wall 28 welded or otherwise secured thereto. The rear deck upper wall 12 adjacent the lid opening 21 is provided with a channel 23 containing a gasket 25 which the edge 27 of the lid 24 engages in its closed position. The lid 24 is hingedly mounted upon the bulkhead 16 of the rear deck or trunk compartment 22 by a hinge, generally designated 30, according to one form of the invention. The hinge 30 is composed generally of a hinge bracket 32, a weight counterbalancing spring 34 and a hinge lever 36 pivotally mounted on the hinge bracket 32 by means of a pivot element or pivot pin 38.

The hinge bracket 32 is stamped from a piece of sheet metal, such as sheet steel and has a vertical main part 40 having an arm or lateral extension 42 extending downwardly and rearwardly at an angle thereto (Figure 1) and terminating in a spring-anchorage lug 44 bent at right angles thereto and having a hole 46 therein. The main part 40 is subdivided into a base or attachment portion 48, an outwardly-bent angle or oblique portion 50, and a parallel pivot carrying portion 52 provided with a square hole 54 for the passage of the squared portion 55 of the shank 57 of the pivot element 38. The base portion 48 is provided with vertically-spaced holes 56 adapted to receive cap screws 58 which are threaded through holes 60 in the bulkhead 16 into weld nuts 62 welded to the rearward or outer side of the bulkhead 16 (Figure 2).

The balancing spring 34 is a tension spring with a hooked lower end 64 which is hooked through the hole 46 in the arm 44 and around a portion of the latter so as to anchor the lower end of the spring 34 to the lug 44. The hooked upper end portion 66 of the spring 34 is hooked through a hole 68 in the rearward end of the rearward part 70 of the hinge lever 36, the forward part 72 of which is secured by cap screws 74 inserted through holes 76 in the edge flange 78 of the lever 36 and through holes 80 in the lid inner wall 28 into weld nuts 82 welded or otherwise secured to the upper side of the lower wall 28. The back portion 84 from which the edge flange 78 of the hinge lever 36 projects is provided intermediate the forward and rearward portions 72 and 70 with a tubular bearing portion 86 through which the shank 57 of the pivot element 38 projects. The latter is provided with heads 88 and 90 at its opposite ends, and a washer 92.

The modified hinge, generally designated 100, shown in Figure 3 has the same general purpose as that shown in Figures 1 and 2, and has a similar hinge lever 102 and counterbalancing spring 104 and pivot element 106. Similar parts accordingly bear the same reference numerals. The hinge bracket 108, however, differs slightly from the hinge bracket 32 of Figures 1 and 2 in that the extension arm 110 is in a different parallel plane from the plane of the base part 112 and is connected therewith by an oblique portion 114 perpendicular to the base portion 112 and the extension arm 110, as well as the pivot-carrying portion 116 which in this modification is in the same plane as the extension arm 110. The latter, moreover, is provided with a spring-anchorage lug 118 which is apertured as before for the reception of the spring end 120, but is bent inwardly toward the bulkhead 16 rather than outwardly away from the latter. The spring thus passes behind the extension arm 110 instead of in front of it, as in Figures 1 and 2, so that the extension arm 110 acts as a shield protecting the spring 104 and the contents of the baggage compartment from one another. The upper end 122 of the spring 104 passes as before into the hole 124 in the rearward end of the hinge bracket 102, which has a rearwardly-projecting tubular bearing portion 126 through which the pivot element 106 passes. The hinge lever 102 is bolted as before to the lid 24. This construction also shields the hinge lever 102, which is installed behind the portion 116 rather than in front of it, as in Figure 1.

The further modified hinge bracket, generally designated 130, shown in Figures 4 and 5 has a similar purpose to that of the hinge bracket 108 of the hinge 100, but is shaped in a different way. The hinge bracket 130 has a central portion 132 with an upstanding arm 134 having a square hole 135 for the square portion 55 of the pivot element 38. The central portion 132 also has in the same plane as itself and the upstanding portion 134 an extension arm 138 which is bent downwardly at an angle and which is provided with a rearwardly-bent apertured spring anchorage lug 140 at its lower end for the reception of the hooked portion 64 of the tension spring 34. The central or main portion 132 is connected to attachment feet 142 by slanting bridge portions 144 (Figure 5) so as to space the plane of the central or main portion 132, upstanding arm 134 and downward extension arm 138 outward from the attachment feet 142 and bulkhead 16 to which it is secured, as by bolts through the holes 146 therein. As in the modified hinge 100 of Figure 3, the hinge, generally designated 150, using the hinge bracket 130 of Figures 4 and 5, has its hinge lever 102 and counterbalancing spring 104 mounted on the back thereof and thus shielded from the contents of the baggage compartment.

In the operation of the hinges 30 of Figures 1 and 2, 100 of Figure 3 and 150 of Figures 4 and 5, let it be assumed that the lid 24 is in its lowered or closed position, with the spring 34 or 104 in its tensioned counterbalancing condition, as shown in the drawings. When the user raises the rearward edge of the lid 24, he thereby swings the forward portion 72 of the hinge lever 36 or 102 upwardly, thus relaxing the tension upon the spring 34 or 104. When, however, the user again closes the lid, he thereby again stretches the spring 34 or 104, thus counterbalancing the weight of the lid 24, at least in part. The rearward positions of the hinge levers and counterbalancing springs in the hinges 100 of Figure 3 and 150 of Figures 4 and 5 as a result of the construction of their brackets 108 and 130 cause these brackets to be interposed as shields and guards between the spring and hinge arm on the one hand and the contents of the baggage compartment on the other, so as to prevent interference therebetween.

As used in the claims herein, the words "A vertically-mountable automobile trunk compartment hinge" means that the hinge bracket 32 (Figures 1 and 2) or 108 (Figure 3) or 130 (Figure 5) is adapted to be mounted in a generally vertical position (Figure 2), such as by being bolted or otherwise secured to a generally vertical structural member, such as the vertical bulkhead 16, rather than to a generally horizontal structural member, such as the trunk compartment upper wall 12 as in many prior automobile trunk compartment hinges.

What I claim is:

1. A vertically-mountable automobile trunk compartment lid hinge comprising a generally vertically-disposed hinge bracket of bent sheet material having a vertically-disposed mounting portion adapted to be secured to a vertical side wall of the compartment and a pivot-supporting portion projecting upwardly from said mounting portion nad a spring anchorage portion connected to and disposed to one side of said mounting portion and having a spring anchorage near the outer end thereof, a pivot element mounted in and transversely to said pivot-supporting portion, a hinge lever having thereon a pivot element bearing disposed intermediate its ends in pivotal engagement with said pivot element, said hinge lever having a lid attachment portion disposed on the same side of said pivot element as said spring anchorage and having a spring-engaging portion disposed on the opposite side of said pivot element from said spring anchorage, and a counterbalancing spring secured at one end to said spring-engaging portion and at its other end to said spring anchorage.

2. A vertically-mountable automobile trunk compartment lid hinge comprising a generally vertically-disposed hinge bracket of bent sheet material having a vertically-disposed mounting portion adapted to be secured to a vertical side wall of the compartment and a pivot-supporting portion projecting upwardly from said mounting portion and a spring anchorage portion connected to and disposed to one side of said mounting portion and having a spring anchorage near the outer end thereof, a pivot element mounted in and transversely to said pivot-supporting portion, a hinge lever having thereon a pivot element bearing disposed intermediate its ends in pivotal engagement with said pivot element, said hinge lever having a lid attachment portion disposed on the same side of said pivot element as said spring anchorage and having a spring-engaging portion disposed on the opposite side of said pivot element from said spring anchorage, and a counterbalancing spring secured at one end to the end of said spring-engaging portion and at its other end to said spring anchorage, said spring anchorage comprising a lug projecting outwardly from said mounting portion.

3. A vertically-mountable automobile trunk compartment lid hinge comprising a generally vertically-disposed hinge bracket of bent sheet material having a vertically-disposed mounting portion adapted to be secured to a vertical side wall of the compartment and a pivot-supporting portion projecting upwardly from said mounting portion and a spring anchorage portion connected to and disposed to one side of said mounting portion and having a spring anchorage near the outer end thereof, a pivot element mounted in and transversely to said pivot-supporting portion, a hinge lever having thereon a pivot element bearing disposed intermediate its ends in pivotal engagement with said pivot element, said hinge lever having a lid attachment portion disposed on the same side of said pivot element as said spring anchorage and having a spring-engaging portion disposed on the opposite side of said pivot element from said spring anchorage, and a counterbalancing spring secured at one end to the end of said spring-engaging portion and at its other end to said spring anchorage, said pivot element supporting portion being disposed in a plane laterally offset from the plane of said mounting portion in spaced parallel relationship therewith.

4. A vertically-mountable automobile trunk compartment lid hinge comprising a generally vertically-disposed hinge bracket of bent sheet material having a vertically-disposed mounting portion adapted to be secured to a vertical side wall of the compartment and a pivot-supporting portion projecting upwardly from said mounting portion and a spring anchorage portion connected to and disposed to one side of said mounting portion and having a spring anchorage near the outer end thereof, a pivot element mounted in and transversely to said pivot-supporting portion, a hinge lever having thereon a pivot element bearing disposed intermediate its ends in pivotal engagement with said pivot element, said hinge lever having a lid attachment portion disposed on the same side of said pivot element as said spring anchorage and having a spring-engaging portion disposed on the opposite side of said pivot element from said spring anchorage, and a counterbalancing spring secured at one end to the end of said spring-engaging portion and at its other end to said spring anchorage, said spring anchorage portion comprising an arm extending obliquely downward from said mounting portion from a location disposed below said pivot element.

5. A vertically-mountable automobile trunk compartment lid hinge, according to claim 1, wherein the spring anchorage portion and the pivot-supporting portion are disposed in a substantially common plane offset from the plane of said mounting portion.

6. A vertically-mountable automobile trunk compartment lid hinge, according to claim 1, wherein the mounting portion has attachment feet disposed in a generally vertical plane but extending laterally in opposite directions from said pivot-supporting portion.

References Cited in the file of this patent

UNITED STATES PATENTS

| | | |
|---|---|---|
| 1,716,394 | Trammel | June 11, 1929 |
| 2,543,600 | Roethel | Feb. 27, 1951 |
| 2,686,340 | Shepard et al. | Aug. 17, 1954 |